(12) United States Patent
Lee

(10) Patent No.: US 10,691,175 B2
(45) Date of Patent: *Jun. 23, 2020

(54) FLEXIBLE DISPLAY DEVICE

(71) Applicant: Samsung Display Co., Ltd., Yongin-si, Gyeonggi-do (KR)

(72) Inventor: Jung Hun Lee, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/552,556

(22) Filed: Aug. 27, 2019

(65) Prior Publication Data

US 2019/0384363 A1 Dec. 19, 2019

Related U.S. Application Data

(63) Continuation of application No. 16/031,976, filed on Jul. 10, 2018, now Pat. No. 10,429,895.

(30) Foreign Application Priority Data

Dec. 29, 2017 (KR) .......................... 10-2017-0183402

(51) Int. Cl.
*H05K 1/00* (2006.01)
*G06F 1/16* (2006.01)
*G09F 9/30* (2006.01)

(52) U.S. Cl.
CPC .......... *G06F 1/1652* (2013.01); *G06F 1/1616* (2013.01); *G06F 1/1641* (2013.01); *G06F 1/1643* (2013.01); *G09F 9/301* (2013.01)

(58) Field of Classification Search
USPC ....................................................... 361/749
See application file for complete search history.

(56) References Cited

U.S. PATENT DOCUMENTS

| 8,711,566 B2 | 4/2014 | O'Brien |
| 2015/0146386 A1 | 5/2015 | Namkung et al. |
| 2017/0373121 A1* | 12/2017 | Leng ........................ H01L 27/32 |

* cited by examiner

*Primary Examiner* — Andargie M Aychillhum
(74) *Attorney, Agent, or Firm* — Lewis Roca Rothgerber Christie LLP

(57) ABSTRACT

A display device includes a display panel including a folding area and a nonfolding area located around the folding area, a panel bottom member under the display panel and overlapping with the folding area and the nonfolding area, and a first pattern formed in the panel bottom member and overlapping with the folding area.

19 Claims, 14 Drawing Sheets

FLEXIBLE DISPLAY DEVICE

CROSS-REFERENCE TO RELATED APPLICATIONS

This application is a continuation of U.S. patent application Ser. No. 16/031,976, filed on Jul. 10, 2018, which claims priority to and the benefit of Korean Patent Application No. 10-2017-0183402, filed on Dec. 29, 2017 in the Korean Intellectual Property Office, the entire disclosure of each of which is incorporated herein by reference.

BACKGROUND

1. Field

Aspects of embodiments of the present invention relate to a flexible display device.

2. Description of the Related Art

Recently, flexible display devices capable of being bent have been developed. Such flexible display devices can be used in various fields since they can be used in a folded or curved form.

Flexible display devices include rollable display devices which can be rolled in the form of a roll, foldable display devices which can be folded like paper, and stretchable display devices which can be changed in size.

Flexible display devices are attracting considerable attention as next-generation display technologies because their volumes can be reduced for easy portability and their screens can be stretched for realizing a large-area display screen.

Meanwhile, a flexible display device may include a display panel and a panel bottom member disposed under the display panel. The panel bottom member can support the display panel, and can alleviate an external impact, thereby reducing an impact transmitted to the display panel. The panel bottom member has a thickness, such as a predetermined level of thickness. As the thickness of the panel bottom member increases, impact resistance may be improved, but flexibility may be deteriorated.

SUMMARY

According to an aspect of embodiments of the present invention, a display device has improved flexibility and impact resistance.

According to another aspect of embodiments of the present invention, in a display device, a pattern shape of a lower portion of a display panel may not be visually recognized on a side of a display screen.

According to one or more exemplary embodiments of the present disclosure, a display device includes: a display panel including a folding area and a nonfolding area located around the folding area; a panel bottom member under the display panel and overlapping with the folding area and the nonfolding area; and a first pattern formed in the panel bottom member and overlapping with the folding area.

According to one or more exemplary embodiments of the present disclosure, a display device includes: a display panel including a folding area and a nonfolding area located around the folding area; and a panel bottom member under the display panel and having a first thickness in the folding area and a second thickness in the nonfolding area, the first thickness being thinner than the second thickness.

However, aspects of the present invention are not restricted to those set forth herein. The above and other aspects of the present invention will become more apparent to one of ordinary skill in the art to which the present invention pertains by referencing the detailed description of some embodiments of the present invention given below.

BRIEF DESCRIPTION OF THE DRAWINGS

The above and other aspects and features of the present invention will become more apparent by describing in further detail some exemplary embodiments thereof with reference to the attached drawings, in which.

DETAILED DESCRIPTION

Figure 1:
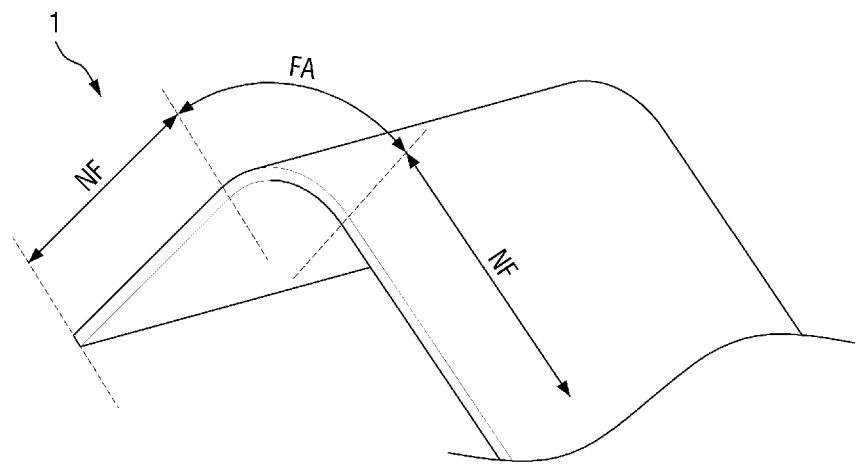
FIG. 1 is a perspective view of a display device according to an embodiment.

Aspects and features of the present disclosure and methods of accomplishing the same may be understood more readily by reference to the following detailed description of some exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will be defined within the scope of the appended claims.

Cases in which elements or layers are referred to as being located "on" other elements or layers include cases in which one or more other layers or other elements are interposed directly on or between other elements. Meanwhile, cases in which the elements are "directly on" indicate that no other element or layer is interposed therebetween. Same reference numerals refer to same or similar constituent elements throughout the specification. The term "and/or" includes each and every combination of one or more of the referenced items.

It is to be understood that, although the terms "first," "second," etc. may be used herein to describe various elements, these elements should not be limited by these terms. These terms are used to distinguish one element from another element. Thus, a "first" element discussed below could be termed a "second" element without departing from the teachings of the present invention.

In this specification, a first direction X is any one direction in a plane, a second direction Y is a direction intersecting the first direction X in the plane, and a third direction Z is a direction perpendicular to the plane.

Like reference numerals designate like or similar elements throughout the specification.

Herein, some embodiments of the present invention will be described with reference to the attached drawings.

Figure 2:
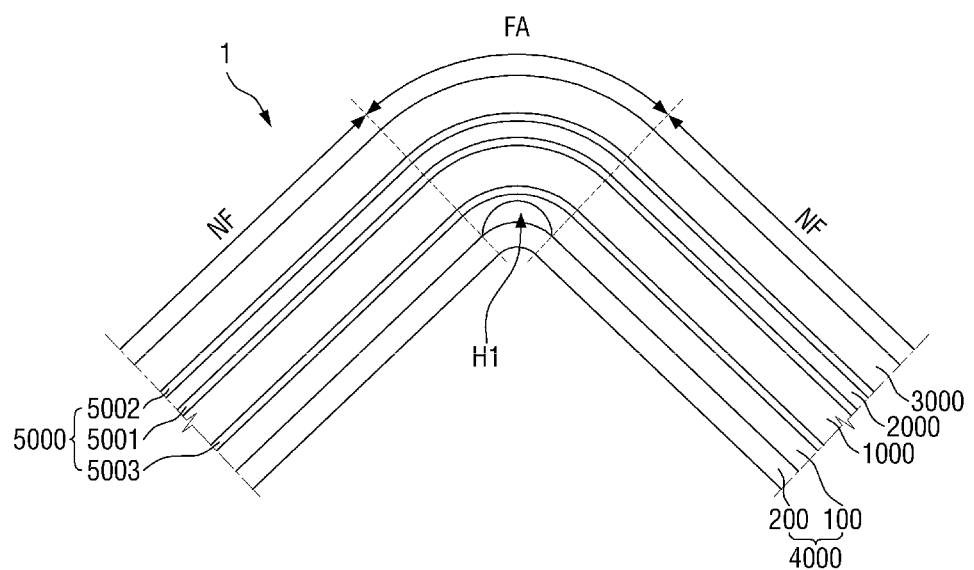
FIG. 2 is a cross-sectional view of a display device according to an embodiment, in which the display device is shown folded.
Figure 3:
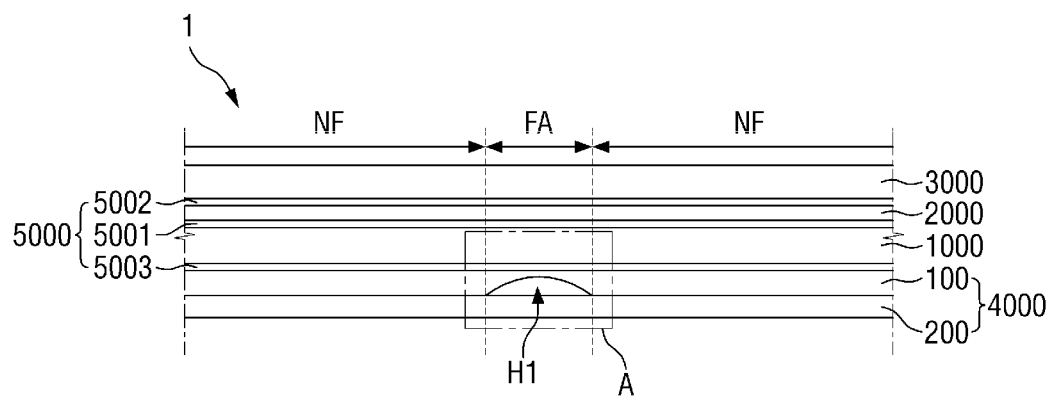
FIG. 3 is a cross-sectional view of a display device according to an embodiment, in which the display device is shown not folded.
Figure 4:
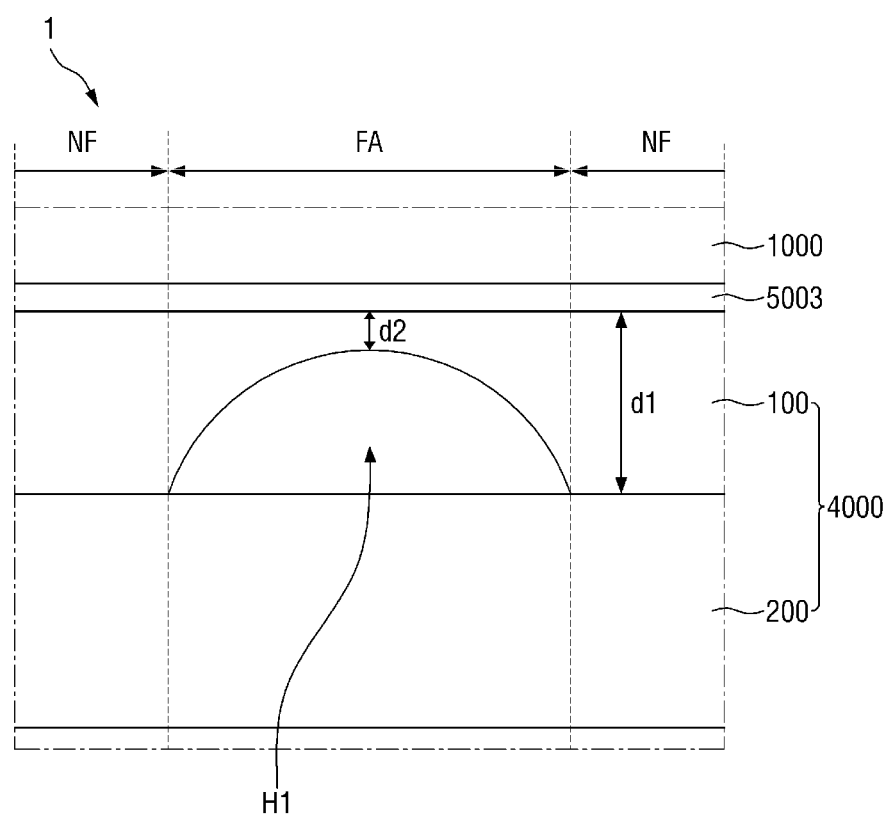
FIG. 4 is an enlarged cross-sectional view of a region "A" in FIG. 3.

FIG. 1 is a perspective view of a display device according to an embodiment. FIG. 2 is a cross-sectional view of a display device according to an embodiment, in which the display device is shown folded. FIG. 3 is a cross-sectional view of a display device according to an embodiment, in which the display device is shown not folded. FIG. 4 is an enlarged cross-sectional view of a region "A" in FIG. 3.

Referring to FIGS. 1 to 4, a display device 1 includes a display panel 1000 and a panel bottom member 4000 disposed under the display panel 1000. In an embodiment, the display device 1 may further include a touch member 2000 and a window 3000, which are disposed over the display panel 1000.

Unless otherwise defined, as used herein, the terms "upper" or "upper surface" refer to a side of a display surface with respect to the display panel 1000, and the terms "lower" or "lower surface" refer to a side opposite to the display surface with respect to the display panel 1000.

The display device 1 includes a folding area FA and a nonfolding area NF connected to the folding area FA and disposed around the folding area FA. The nonfolding area NF is generally located on one plane, and is not folded, bent, or warped, even when the use form of the display device 1 is changed. On the other hand, the folding area FA may be deformed in shape depending on the use form of the display device 1. In other words, the folding area FA may be located on a plane in an unfolded state, but it may be folded, bent, or warped to be disposed along a curved surface.

Although it is shown in the drawings that the display device 1 includes one folding area FA, the present invention is not limited thereto, and the display device 1 may include a plurality of folding areas FA. When the display device 1 includes a plurality of folding areas FA, the display device 1 may be folded, bent, or warped with respect to each of the folding areas FA.

The display panel 1000, which is a panel for displaying an image, may be, for example, an organic light emitting display panel. In the following embodiments, an organic light emitting display panel is described as the display panel 1000. However, the present invention is not limited thereto, and other types of display panels, such as a liquid crystal display panel and an electrophoretic panel, may be applied.

The display panel 1000 includes a plurality of organic light emitting elements arranged on a substrate. The substrate may be a rigid substrate made of glass or the like, or a flexible substrate made of polyimide or the like. When a polyimide substrate is applied as the substrate, the display panel 1000 may be warped, bent, folded, or rolled.

In an embodiment, the window 3000 is disposed over the display panel 1000. The window 3000 is disposed over the display panel 1000 to protect the display panel 1000 and transmit light emitted from the display panel 1000.

The window 3000 may include a transparent material. The window 3000 may include, for example, glass or plastic. The window 3000 may have flexible properties. In particular, even when the window 3000 includes glass, the window 3000 can maintain flexible properties by using a chemical reinforced glass having flexibility.

The window 3000 may be disposed to overlap the display panel 1000 and cover the entire surface of the display panel 1000.

In an embodiment, the touch member 2000 may be disposed between the display panel 1000 and the window 3000. The touch member 2000 may be a rigid panel type, a flexible panel type, or a film type. In an embodiment, the touch member 2000 may have substantially the same size as the display panel 1000 and may be disposed to overlap the display panel 1000, and the side surface of the touch member 2000 may be aligned with the side surface of the display panel 1000, but the present invention is not limited thereto.

The display panel 1000 and the touch member 2000, or the touch member 2000 and the window 3000 may be attached to each other by an adhesive layer 5000, such as an optical clear adhesive (OCA), an optical clear resin (OCR), or a pressure-sensitive adhesive (PSA). For example, the display panel 1000 and the touch member 2000 may be attached to each other by a first adhesive layer 5001, and the touch member 2000 and the window 3000 may be attached to each other by a second adhesive layer 5002. The first adhesive layer 5001 and the second adhesive layer 5002 may be transparent adhesive layers.

In another embodiment, the touch member 2000 may be omitted. In this case, the display panel 1000 and the window 3000 may be directly attached to each other by the transparent adhesive layer 5000.

In some embodiments, the display panel 1000 may include a touch electrode unit therein.

The panel bottom member 4000 is disposed under the display panel 1000. In an embodiment, the panel bottom member 4000 may include a support member 100 and a buffer member 200, and may be attached to the lower surface of the display panel 1000 by a third adhesive layer 5003.

In an embodiment, the panel bottom member 4000 may have substantially the same size as the display panel 1000 and may be disposed to overlap with the display panel 1000, and the side surface of the panel bottom member 4000 may be aligned with the side surface of the display panel 1000, but the present invention is not limited thereto. In an embodiment, the support member 100 and the buffer member 200, constituting the panel bottom member 4000, may further perform a heat radiation function, an electromagnetic wave blocking function, a pattern visibility preventing function, and/or a strength enhancing function in addition to a supporting function and a buffering function.

The support member 100 and the buffer member 200 may be provided in any of various forms, such as a layer, a film, a sheet, a plate, and a panel.

In an embodiment, the support member 100 has substantially the same size as the display panel 1000, and may be disposed on the entire lower surface of the display panel 1000 as described above. The support member 100 may be made of a material having rigidity higher than a predetermined level. For example, the support member 100 may be formed of a metal material, such as Invar, which is an alloy of Ni and Cu, stainless steel (SUS), titanium (Ti), or copper (Cu). However, the present invention is not limited to the above examples, and may include any material having sufficient rigidity for supporting the display panel 1000. The rigidity may be, for example, 70 GPa.

In an embodiment, the support member 100 can prevent or substantially prevent the transmission of light to prevent or substantially prevent a pattern H1 of the lower surface of the support member 100 and/or a pattern of the buffer member 200 from being visually recognized on the side of the display screen. The support member 100 may include a light absorbing material such as black pigment or dye. However, in an embodiment, the support member 100 may include a metal material absorbing or reflecting light, and the support member 100 may not include a light absorbing material because the support member 100 itself blocks the transmission of light.

The support member 100 may include the first pattern H1. The first pattern H1 may be disposed on the lower surface of the support member 100 in the folding area FA. In an embodiment, the first pattern H1 has a groove shape recessed inward with respect to the lower surface of the support member 100. It is possible to prevent or substantially prevent the first pattern H1 from being visually recognized on the side of a display screen by forming the first pattern H1 on the lower surface of the support member 100.

Figure 6:
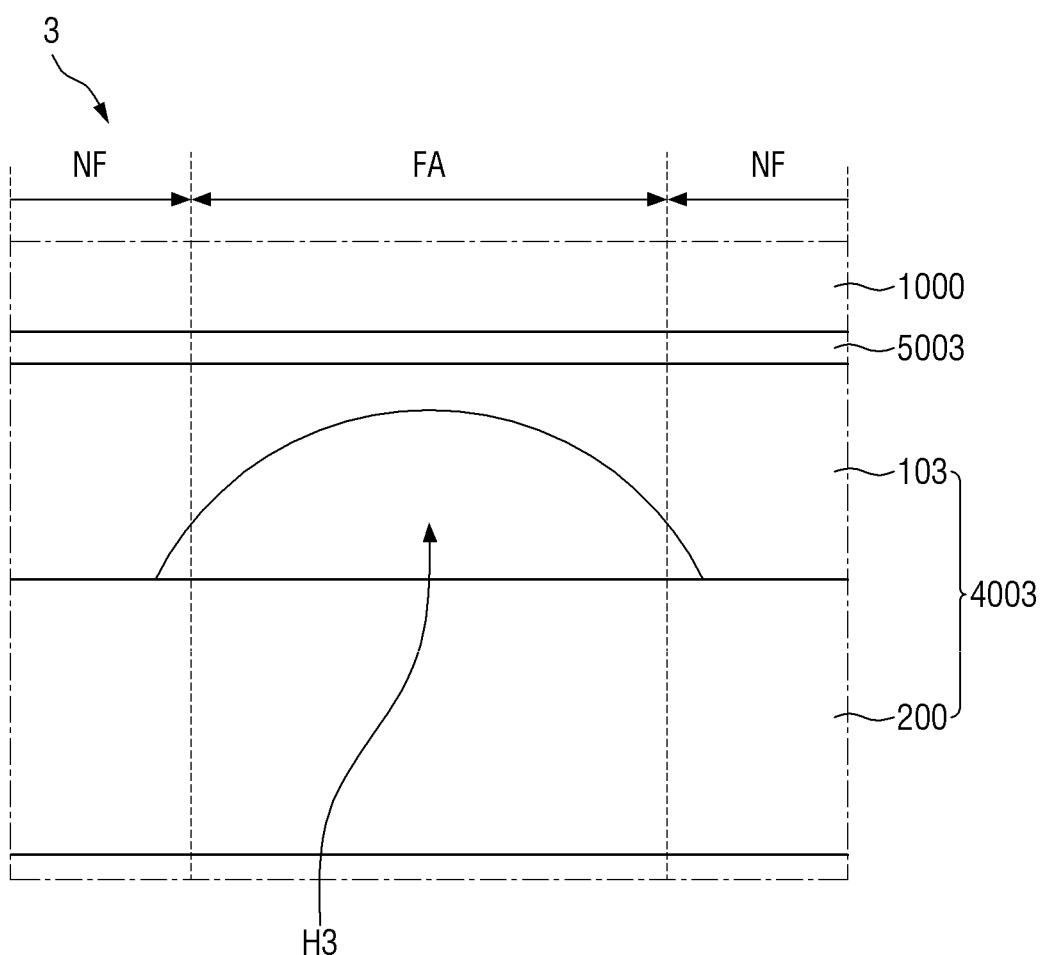

In an embodiment, the first pattern H1 may be disposed over the entire folding area FA. That is, both ends of the first pattern H1 may be aligned at the boundaries of the folding area FA and the nonfolding area NF. However, the present invention is not limited thereto, and both ends of the first pattern H1 may be disposed in the nonfolding area NF as shown in FIG. 6, or may be disposed in the folding area FA.

In an embodiment, the first pattern H1 may have a line shape extending continuously along the arrangement direction of the folding area FA. For example, a cross-section of the first pattern H1 may have an arcuate shape, that is, a tunnel shape extending along the folding area FA. However, the present invention is not limited thereto, and the first pattern H1 may also include a plurality of patterns separately arranged along the arrangement direction of the folding area FA. The plurality of neighboring patterns may be spaced apart from each other by a distance (e.g., a predetermined distance), and the lower surface of the support member 100 and the upper surface of the buffer member 200 may be in contact with each other where no pattern is formed.

In an embodiment, an empty space formed by the first pattern H1 may be filled with air, and an air gap may be defined in a space surrounded by the support member 100 and the buffer member 200. The air gap not only absorbs an external impact applied to the display device 1, but also prevents or substantially prevents the external impact from propagating, thereby improving the impact resistance of the display device 1. In another embodiment, the empty space formed by the first pattern H1 may be filled with an elastic member capable of being flexible and absorbing an external impact.

The first pattern H1 can alleviate the stress due to the folding of the display device 1 as well as perform the above buffering function to improve the flexibility of the display device 1. Specifically, when the display device 1 is folded, the upper surface of the support member 100 is subjected to tensile stress, whereas the lower surface of the support member 100 is subjected to compressive stress. When the first pattern H1 is formed on the lower surface of the support member 100 subjected to compressive stress, the spacing of the first patterns H1 is reduced, thereby alleviating the stress.

Moreover, the stress applied to the support member 100 can be alleviated by changing the thickness of the support member 100. That is, a thickness d2 of the support member 100 in the folding area FA may be thinner than a thickness d1 of the support member 100 in the nonfolding area NF. The support member 100 may include the first pattern H1 in the folding area FA, and the thickness d2 of the support member 100 in an area where the first pattern H1 is formed may be thinner than the thickness d1 of the support member 100 in an area where the first pattern H1 is not formed.

In an embodiment, since the support member 100 includes a material having rigidity, the flexibility of the support member 100 may decrease compared to when the support member includes a flexible material. Generally, the rigidity and flexibility of the support member 100 have an inverse proportion relation, and the flexibility thereof decreases when the rigidity thereof increases. The rigidity and flexibility of the support member 100 depend on the thickness of the support member 100. As the thickness of the support member 100 increases, the rigidity thereof increases to improve the impact resistance of the display device 1, but the flexibility thereof decreases to cause folding to become difficult. For example, when the support member 100 is formed to have a same thickness over the entire display device 1, the display device 1 can have excellent impact resistance or excellent flexibility, but it is difficult to have both excellent impact resistance and excellent flexibility. On the other hand, when a thickness of the support member 100 in the folding area FA is made thinner than a thickness of the support member 100 in the nonfolding area NF, the flexibility of the display device 1 can be improved while the impact resistance of the display device 1 is maintained.

In an embodiment, the thickness d1 of the support member 100 in the nonfolding area NF may be about 50 μm to about 100 μm. When the thickness d1 of the support member 100 is about 50 μm or more, the support member 100 may have sufficient rigidity and impact resistance for supporting and protecting the display panel 1000. As the thickness of the support member 100 increases, rigidity and impact resistance are improved. However, when the thickness of the support member 100 is too thick, it may be inversely proportional to the thinning of the display device 1 and may be disadvantageous in terms of costs, so that, in an embodiment, the thickness of the support member 100 may be about 100 μm.

When the thickness d2 of the support member 100 in the folding area FA is too thick, flexibility deteriorates. When the thickness d2 thereof is too thin, it is difficult to support the display panel 1000. In an embodiment, the thickness d2 of the support member 100 may be about 20 μm to 30 μm. The thickness d2 of the support member 100 in the folding area FA, which may be a minimum thickness of the support member 100, refers to a thickness of the support member 100 at a base point of the first pattern H1.

The buffer member 200 is disposed beneath the support member 100. As described above, in an embodiment, the buffer member 200 has substantially the same size as the display panel 1000, and may cover the entire lower surface of the display panel 1000.

The first pattern H1 may be concurrently (e.g., simultaneously) formed together with the support member 100, or may be formed by removing a part of the support member 100 after the formation of the support member 100. In an embodiment, for example, in a case of forming the support member 100 through a rolling process, the first pattern H1 and the support member 100 may be concurrently (e.g., simultaneously) formed by forming a predetermined protrusion on a roll. As another example, after the support member 100 is formed, the first pattern H1 may be formed through a metal etching method or the like. However, the method of forming the first pattern H1 is not limited to the above examples, and may differ depending on a material constituting the support member 100.

In an embodiment, the buffer member 200 may be integrally formed on the lower surface of the support member 100 without a separate adhesive member. The buffer member 200 can prevent or substantially prevent the display device 1 absorbing an external impact from being damaged. The buffer member 200 may be composed of a single layer or a plurality of laminated films. The buffer member 200 may include an elastic material, such as polyurethane resin or polyethylene resin. The buffer member 200 may be made of a material having higher flexibility than the support member 100.

Herein, some other embodiments will be described. In the following embodiments, description of the same configurations as those of the previously described embodiment may be omitted or simplified, and differences will be mainly described.

FIGS. 5 to 9 are cross-sectional views showing panel bottom members of display devices according to some embodiments. FIG. 10 is a cross-sectional view of a display device of FIG. 9, in which the display device is shown folded.

Figure 5:
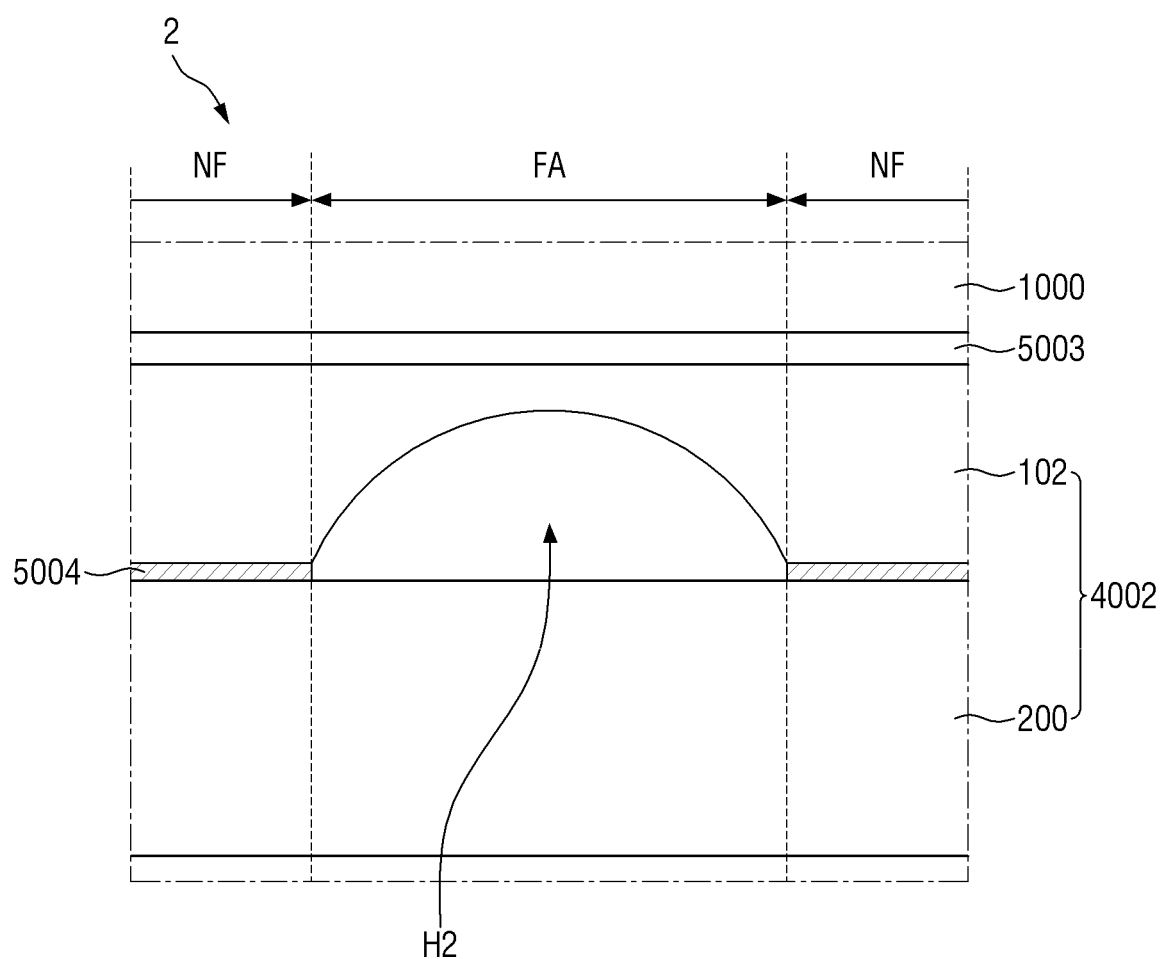
FIGS. 5 to 9 are cross-sectional views showing panel bottom members of display devices according to some embodiments.

Referring to FIG. 5, a display device 2 according to an embodiment is different from the display device 1 of FIG. 4 in that a panel bottom member 4002 of the display device 2 further includes a fourth adhesive layer 5004 disposed between a support member 102 and a buffer member 202.

The buffer member 202 may be formed separately from the support member 102, and then may be attached to the support member 102 through the fourth adhesive layer 5004. The fourth adhesive layer 5004 may be disposed in the nonfolding area NA except for the folding area FA where a first pattern H2 is formed.

In an embodiment, the fourth adhesive layer 5004 may be made of a same material as the first to third adhesive layers 5001 to 5003.

Referring to FIG. 6, a display device 3 according to an embodiment is different from the display device 1 of FIG. 4 in that a panel bottom member 4003 of the display device 3 has a first pattern H3 of a support member 103 disposed over the folding area FA and the nonfolding area NF as compared with the first pattern H1 of FIG. 4 disposed only in the folding area FA.

In an embodiment, the first pattern H3 may be mostly disposed in the folding area FA, and both sides of the first pattern H3 may be disposed in the nonfolding area NF. A base point of the first pattern H3 may be disposed in the folding area FA, and an area of the first pattern H3 disposed in the folding area FA may be greater than that of the first pattern H3 disposed in the nonfolding area NF.

Figure 7:
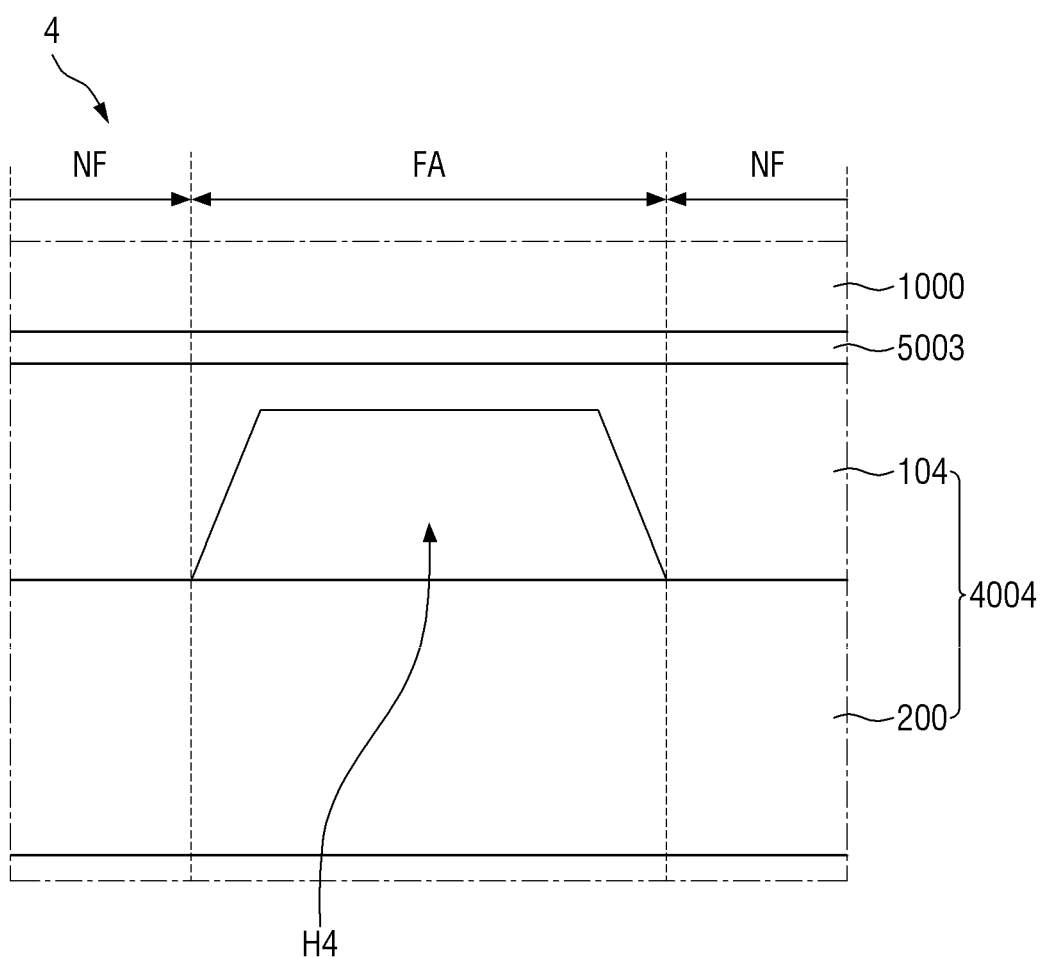
Figure 8:
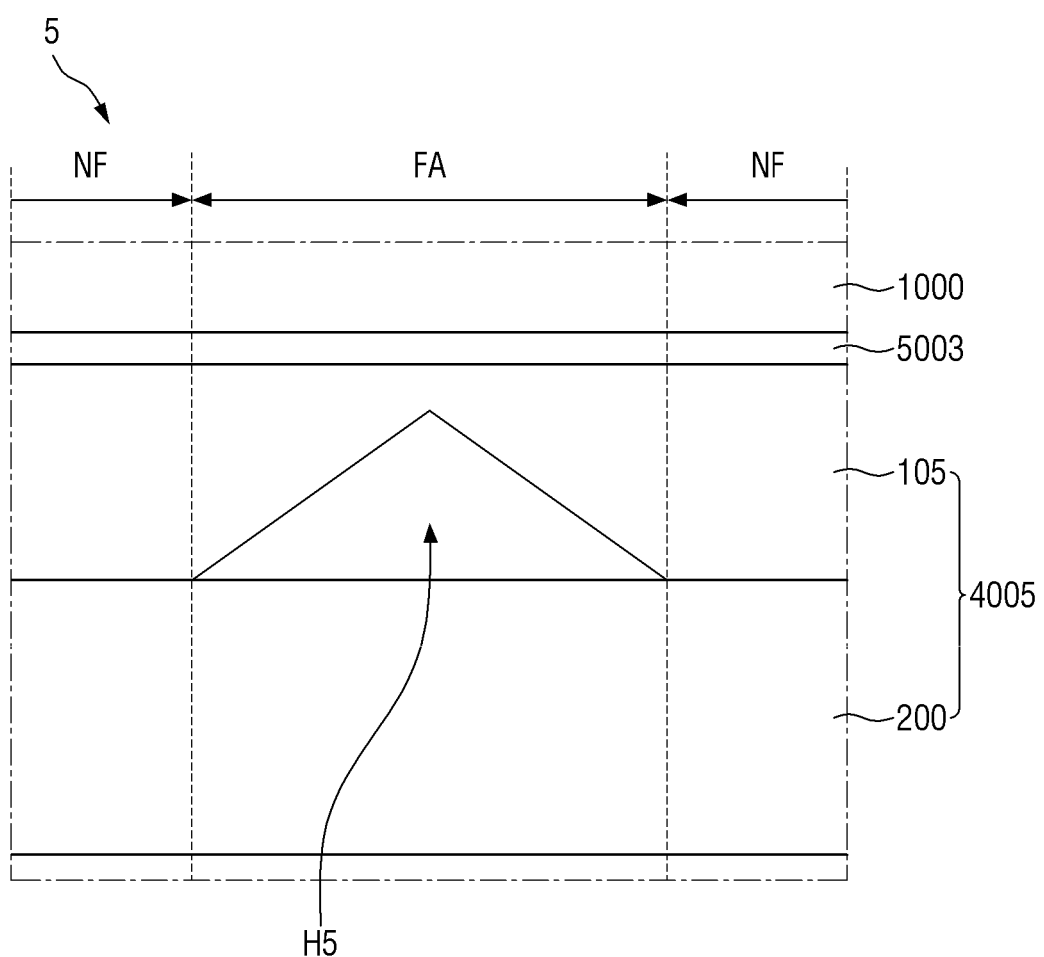

Referring to FIGS. 7 and 8, panel bottom members 4004 and 4005 of display devices 4 and 5 may include first patterns H4 and H5 of support members 104 and 105 having a trapezoidal (or rectangular) and triangular cross-section, respectively.

For example, the first pattern H4 may include a trapezoidal cross-section having a flat base surface. In an embodiment, the first pattern H4 may have an isosceles trapezoidal shape symmetrical with respect to a center of the folding area FA. When the shape of the first pattern H4 is symmetrical with respect to the center of the folding area FA, stress applied to the support member 100 may be uniformly dispersed, such that the flexibility of the display device 4 can be improved.

Similarly to the first pattern H4 of FIG. 7, the first pattern H5 of FIG. 8 may have a triangular shape that is also symmetrical with respect to the center of the folding area FA.

Figure 9:
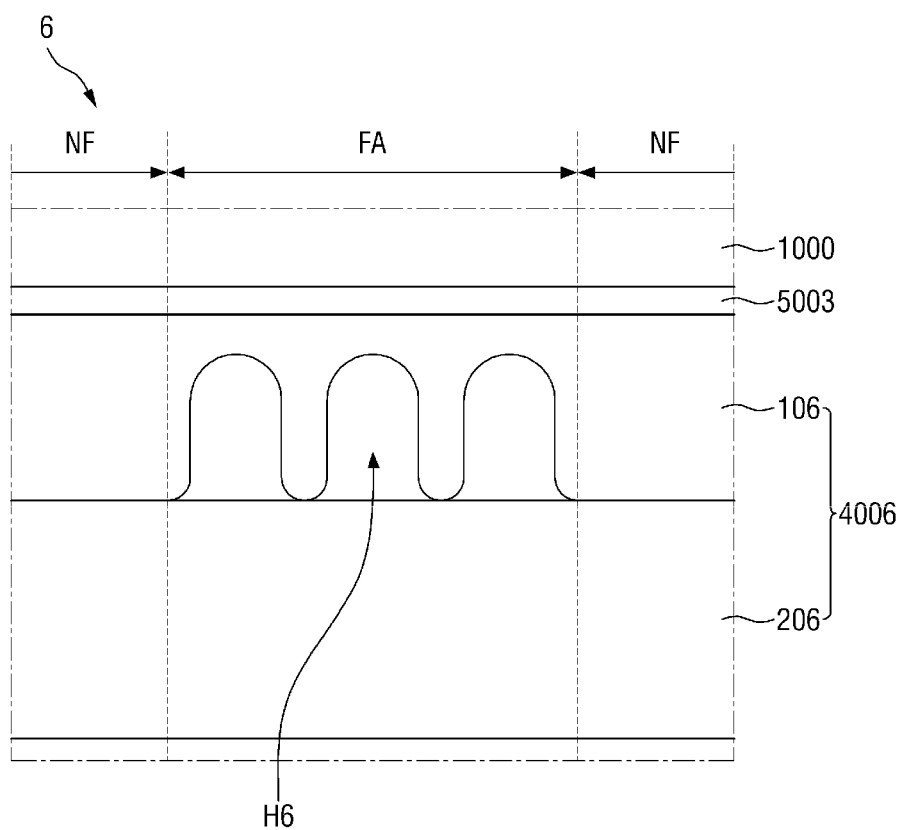
Figure 10:
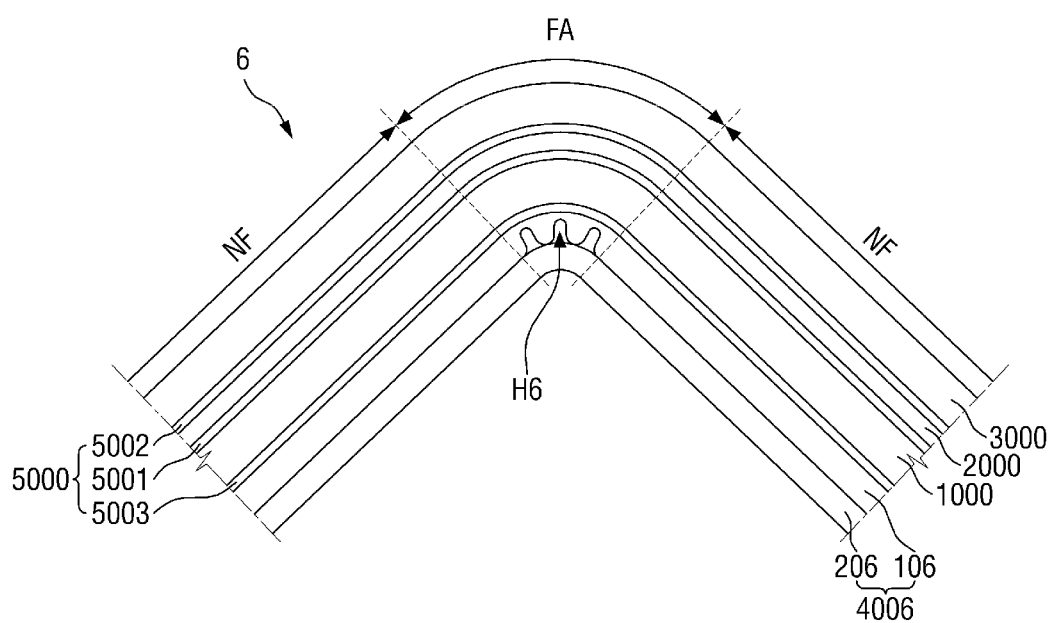
FIG. 10 is a cross-sectional view of a display device of FIG. 9, in which the display device is shown folded.

Referring to FIGS. 9 and 10, a panel bottom member 4006 of a display device 6 according to an embodiment may include a first pattern H6 having an uneven shape.

The first pattern H6 may be a surface unevenness formed on a lower surface of a support member 106. In an embodiment, the first pattern H6 may have a shape in which a plurality of grooves recessed with respect to the lower surface of the support member 106 is arranged. In an embodiment, the first pattern H6 includes a plurality of relatively recessed concave portions and a plurality of relatively protruded convex portions.

In consideration of the rigidity of the support member 106, the first pattern H6 may have a shape in which a width of the concave portion is greater than a width of the convex portion. That is, an amount of the removed area of the support member 106 may be increased, and a stress applied to the support member 106 at the time of folding can be alleviated. However, the present invention is not limited thereto, and the width of the convex portion may be greater than the width of the concave portion.

In an embodiment, the convex portion of the first pattern H6 is disposed on substantially the same plane as the lower surface of the support member 106, or is located inward with respect to the lower surface of the support member 106. That is, the convex portion of the first pattern H6 may not protrude from the lower surface of the support member 106. Although it is shown in the drawing that the convex portion of the first pattern H6 is in contact with a buffer member 206, the present invention is not limited thereto, and the convex portion of the first pattern H6 may not be in contact with the buffer member 206.

The interval between the convex portions of the first pattern H6, that is, the width of the concave portion, may increase with the folding of the display device 6, as shown in FIG. 10. As described above, when the display device 6 is folded, the lower surface of the support member 106 may be subjected to compressive stress. The first pattern H6 is disposed in the folding area FA subjected to the compressive stress, and the interval between the convex portions of the first pattern H6 is narrowed, thereby alleviating the stress. Moreover, the support member 106 can more stably support the display panel 1000 by the convex portions of the first pattern H6, and thus the impact resistance of the display device 6 can be improved.

Figure 11:
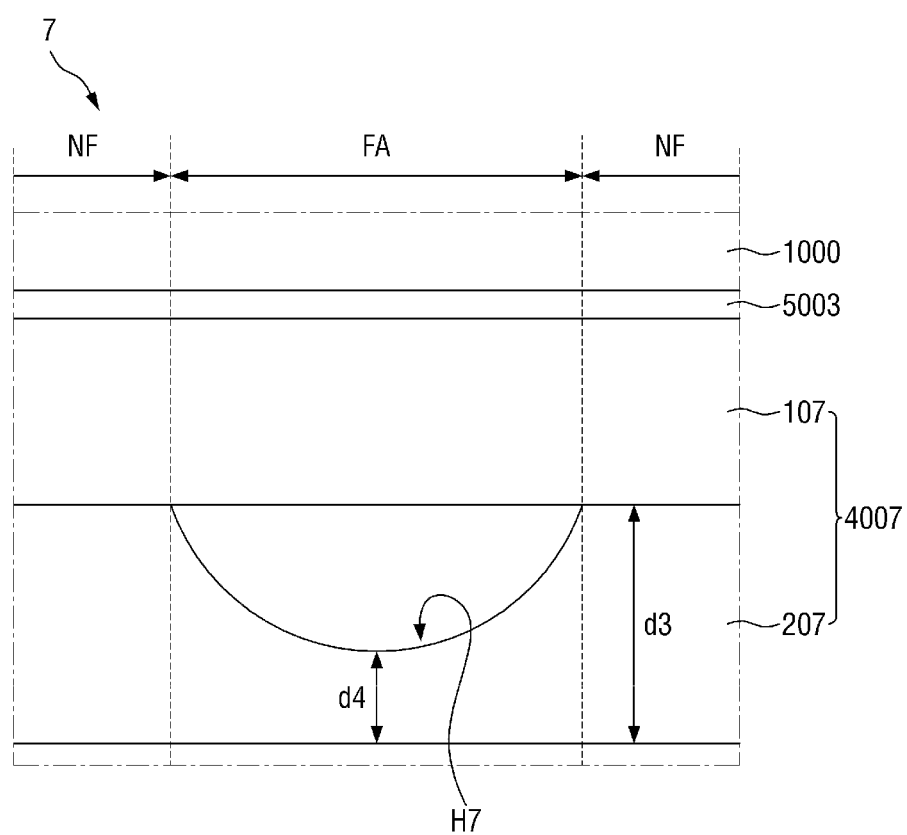
FIGS. 11 and 12 are cross-sectional views showing panel bottom members of display devices according to some embodiments.
Figure 12:
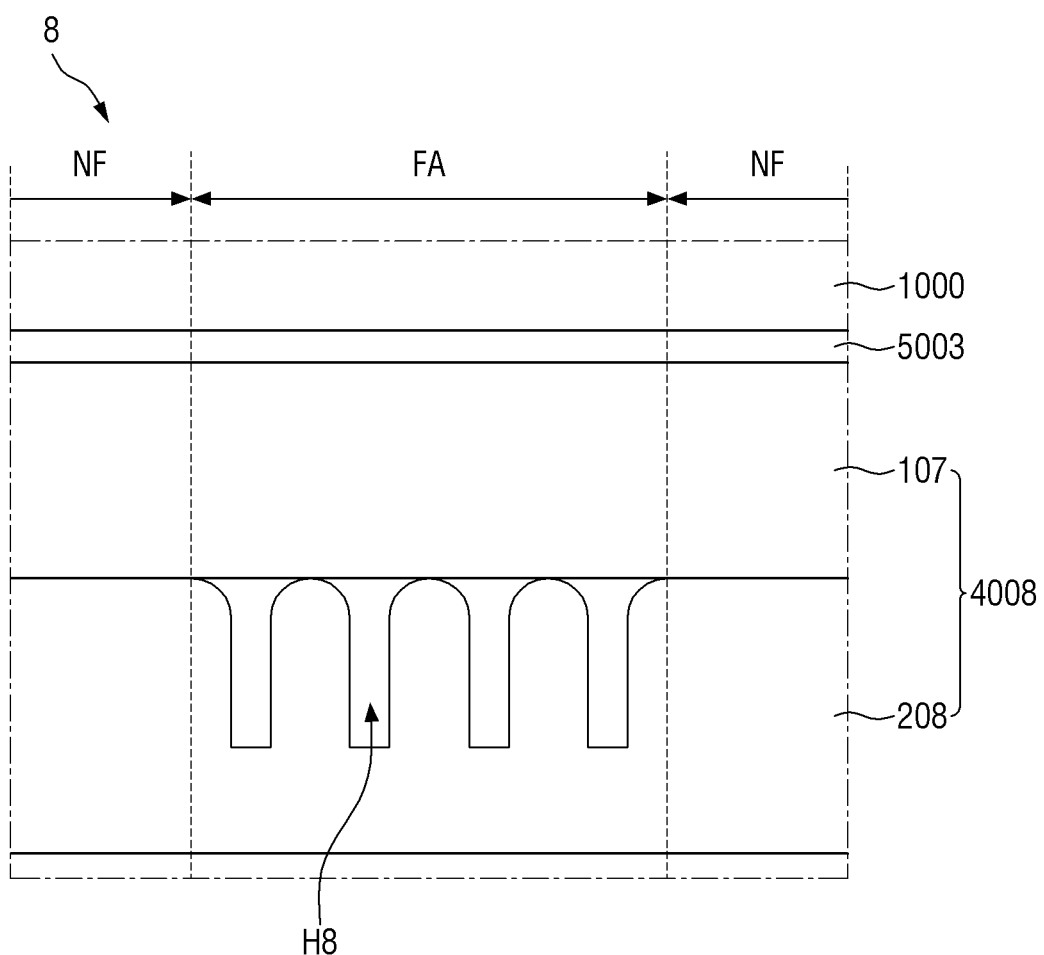
Figure 13:
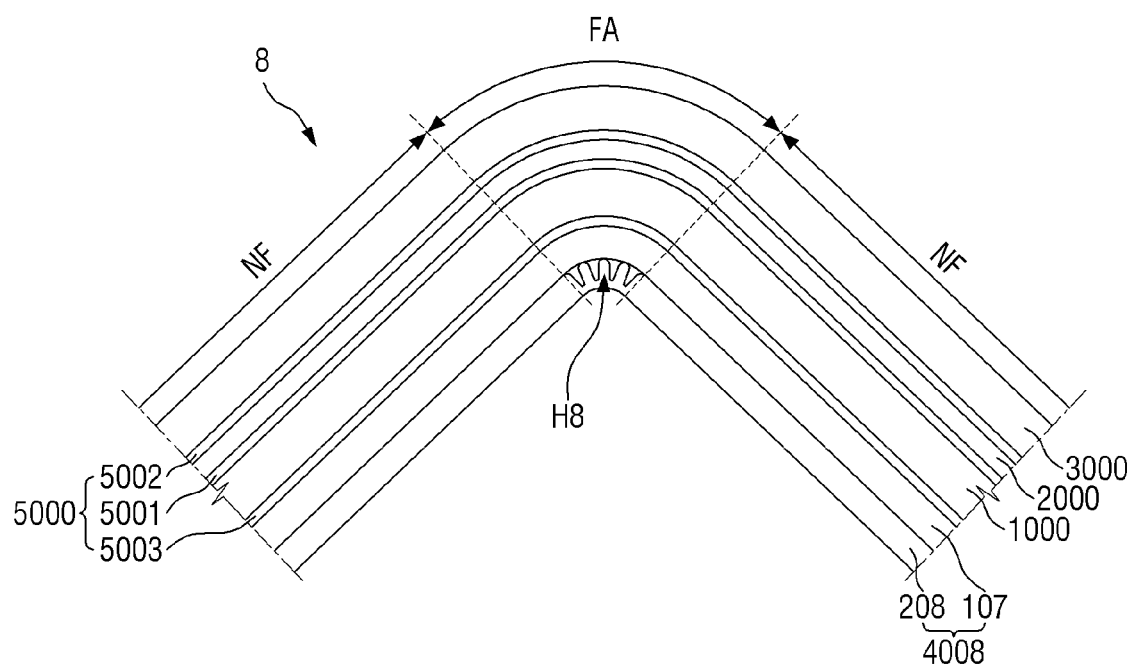
FIG. 13 is a cross-sectional view of a display device of FIG. 12, in which the display device is shown folded.
Figure 14:
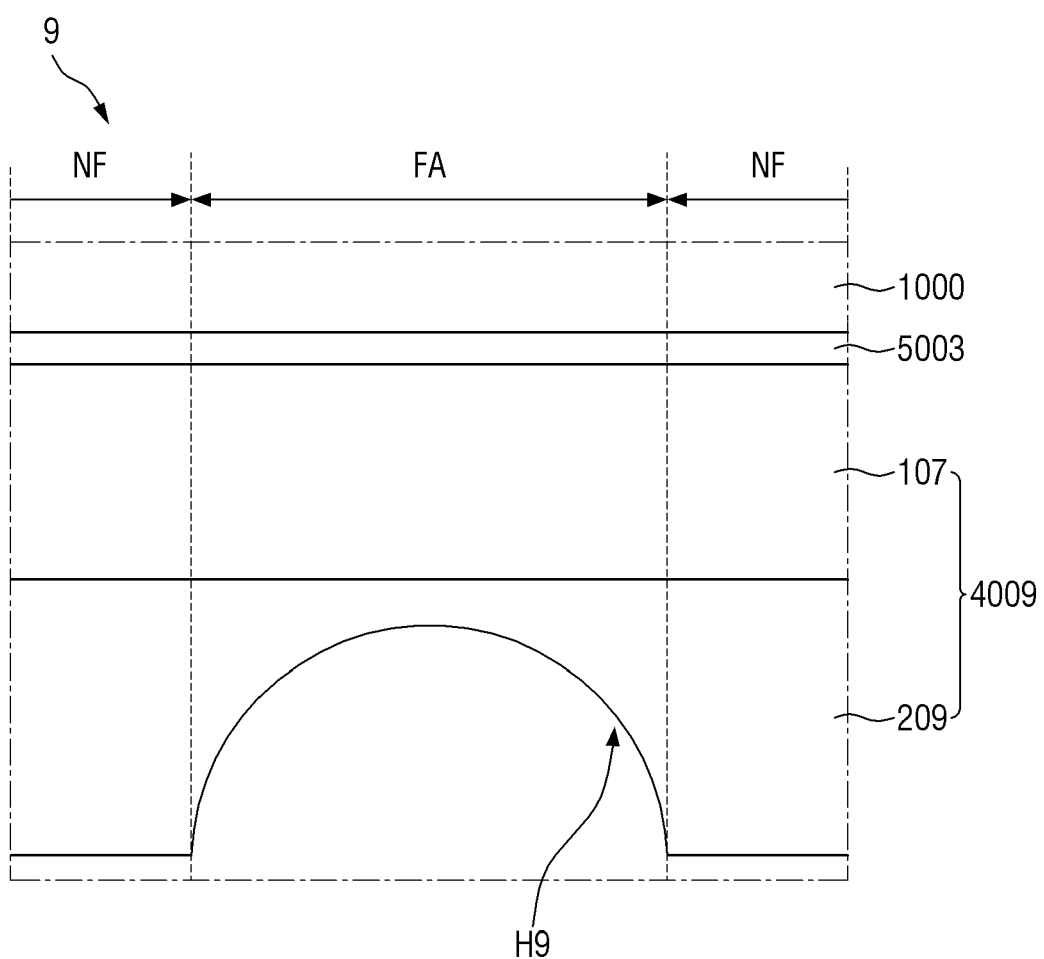
FIG. 14 is a cross-sectional view showing a panel bottom member of a display device according to an embodiment.

FIGS. 11 and 12 are cross-sectional views showing panel bottom members of display devices according to some embodiments. FIG. 13 is a cross-sectional view of a display device of FIG. 12, in which the display device is shown folded. FIG. 14 is a cross-sectional view of showing a panel bottom member of a display device according to an embodiment.

Display devices 7, 8, and 9 of FIGS. 11 to 14 are different from the display devices 1 to 6 of FIGS. 1 to 10 in that panel bottom members 4007, 4008, and 4009 include second patterns H7, H8, and H9 disposed in buffer members 207, 208, and 209, respectively.

Referring to FIG. 11, the panel bottom member 4007 includes the second pattern H7 disposed on an upper surface of the buffer member 207 in the folding area FA.

Unlike the first patterns H1 to H6, the second pattern H7 may be disposed on the upper surface of the buffer member 207. Since a support member 107 is disposed between the buffer member 207 and the display panel 1000, the second pattern H7 of the buffer member 207 is not visually recognized on the display panel 1000.

Similarly to the first patterns H1 to H6, in an embodiment, the second pattern H7 may be disposed over the entire folding area FA. In an embodiment, the second pattern H7 may have a line shape extending continuously along the arrangement direction of the folding area FA, or may have a shape in which a plurality of patterns separated from each other is arranged.

The second pattern H7 may have any of various cross-sectional shapes, such as an arcuate shape, a rectangular shape, and a triangular shape.

In an embodiment, an empty space formed by the second pattern H7 may be filled with air to form an air gap. The air gap can absorb an external impact applied to the display device 7, and can prevent or substantially prevent the external impact from propagating, thereby improving the impact resistance of the display device 7. In another embodiment, the empty space formed by the second pattern H7 may be filled with a material having higher flexibility than the buffer member 207.

The second pattern H7 can alleviate the stress due to the folding of the display device 7 in addition to a buffering function. Specifically, when the display device 7 is folded, the upper surface of the buffer member 207 may be subjected to tensile stress. The surface area of the buffer member 207 in the case in which the second pattern H7 is formed in the folding area FA is larger than that of the buffer member 207 in the case in which the second pattern H7 is not formed in the folding area FA. In this case, the tensile stress is dispersed along the surface of the second pattern H7, thereby alleviating the stress applied to the buffer member 207.

Moreover, the stress applied to the buffer member 207 can be alleviated by changing the thickness of the buffer member 207. That is, a thickness d4 of the buffer member 207 in the folding area FA may be thinner than a thickness d3 of the buffer member 207 in the nonfolding area NF.

Generally, flexibility increases as the thickness of a member decreases, so that the flexibility of the display device 7 can be improved by decreasing the thickness d4 of the buffer member 207 in the folding area FA. In addition, a buffering function can be maintained by making the thickness d3 of the buffer member 207 relatively large in the nonfolding area NF. In an embodiment, the thickness d3 of the buffer member 207 in the nonfolding area NF may be about 250 μm to about 300 μm, and the thickness d4 of the buffer member 207 in the folding area FA including the second pattern H7 may be about 50 μm to about 100 μm. Here, the thickness d4 of the buffer member 207 in the folding area FA, which may be a minimum thickness of the buffer member 207, refers to a thickness of the buffer member 207 at a base point of the second pattern H7.

Referring to FIGS. 12 and 13, the buffer member 208 of the panel bottom member 4008 may include the second pattern H8 having an uneven shape.

In an embodiment, the second pattern H8 may have a shape in which a plurality of grooves recessed with respect to an upper surface of the buffer member 208 is arranged. In an embodiment, the second pattern H8 includes a plurality of relatively recessed concave portions and a plurality of relatively protruded convex portions.

Although it is shown in the drawing that the second pattern H8 has an uneven shape with respect to the upper surface of the buffer member 208, the present invention is not limited thereto, and the second pattern H8 having an uneven shape may be formed on a lower surface of the buffer member 208.

As shown in FIG. 13, the second pattern H8 can alleviate a tensile stress applied to the upper surface of the buffer member 208 by increasing intervals at the time of folding the display device 8.

Unlike the first pattern H6 of FIG. 9, in the second pattern H8, the width of the convex portion may be larger than the width of the concave portion. That is, an area in which the buffer member 208 is removed may be reduced, thereby maintaining a buffering function. However, the present invention is not limited thereto, and the width of the concave portion may be larger than the width of the convex portion.

Referring to FIG. 14, the buffer member 209 of the panel bottom member 4009 may include the second pattern H9 disposed at the lower portion thereof.

The second pattern H9 disposed at the lower portion of the buffer member 209 may perform substantially the same function as the first pattern H1 of FIG. 3.

Figure 15:
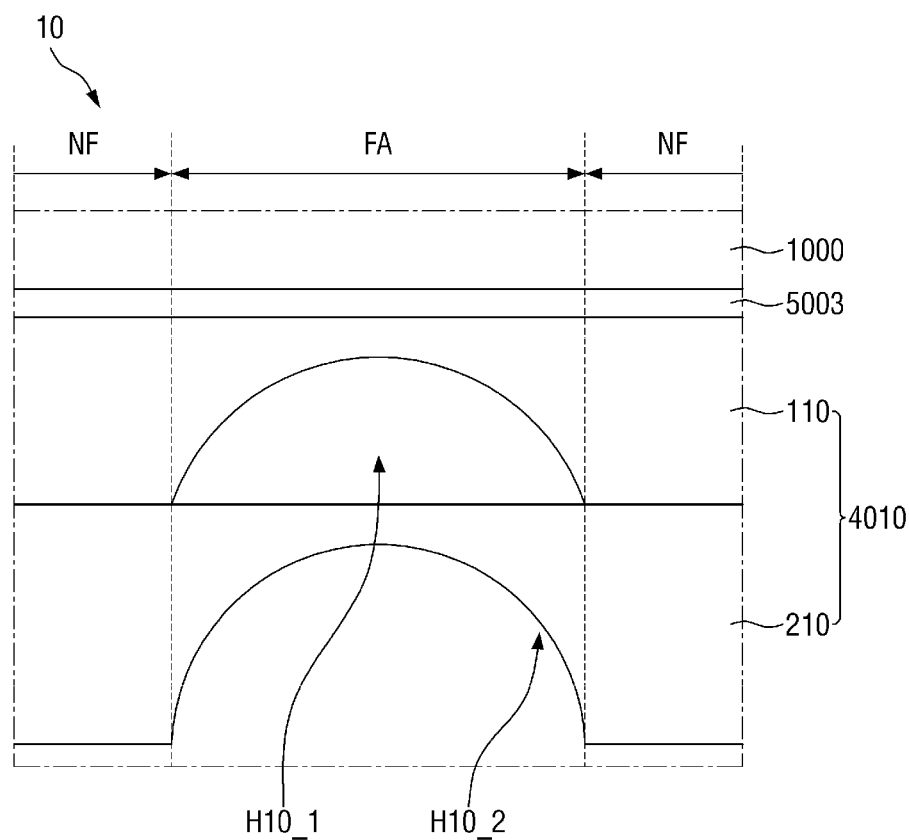
FIGS. 15 and 16 are cross-sectional views showing panel bottom members of display devices according to some embodiments.
Figure 16:
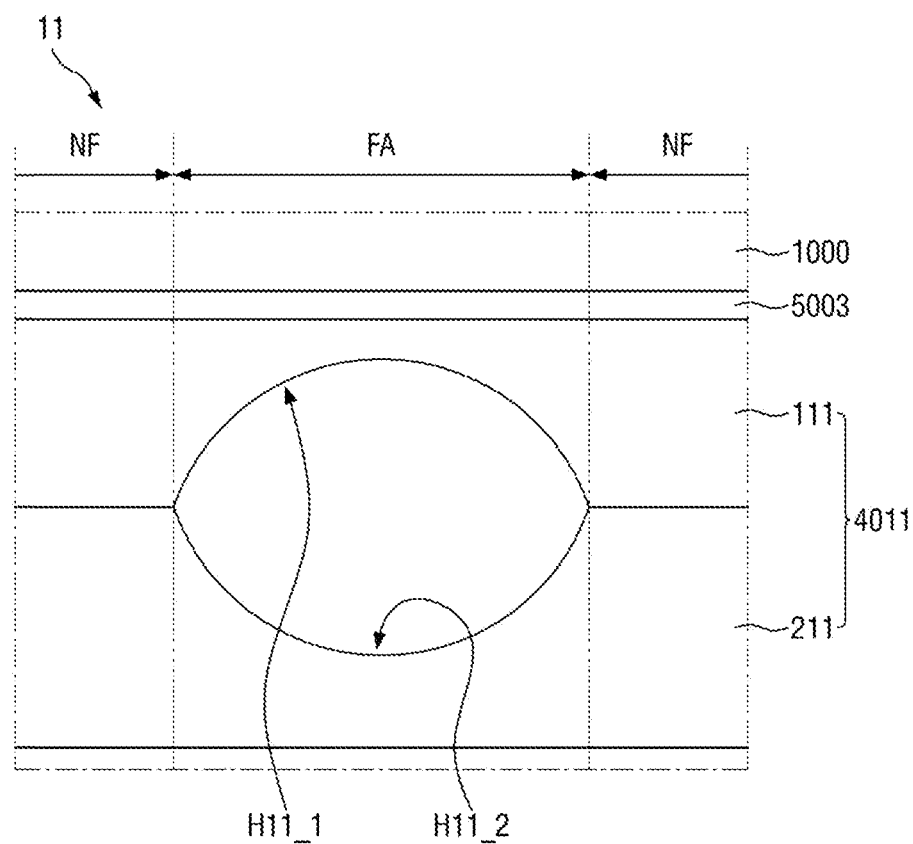

FIGS. 15 and 16 are cross-sectional views showing panel bottom members of display devices according to some embodiments.

Referring to FIGS. 15 and 16, panel bottom members 4010 and 4011 of display devices 10 and 11 may include both first patterns H10_1 and H11_1 and second patterns H10_2 and H11_2, respectively.

Each of the first patterns H10_1 and H11_1 may be formed on the lower surface of each of support members 110 and 111, whereas each of the second patterns H10_2 and H11_2 may be formed on the upper surface or the lower surface of each of buffer members 210 and 211.

The first patterns H10_1 and H11_1 and the second patterns H10_2 and H11_2 may be disposed to overlap each other. For example, in a cross-section, base points of the first patterns H10_1 and H11_1 may be substantially aligned with base points of the second patterns H10_2 and H11_2.

As described above, the thickness d2 of each of the support members 110 and 111 in the folding area FA may be thinner than the thickness d1 of each of the support members 110 and 111 in the nonfolding area NF. Further, the thickness d4 of each of the buffer members 210 and 211 in the folding area FA may be thinner than the thickness d3 of each of the buffer members 210 and 211 in the nonfolding area NF. In an embodiment, the thickness d2 of each of the support members 110 and 111 in the folding area FA may be thinner than the thickness d4 of each of the buffer members 210 and 211 in the folding area FA.

Although it is shown in the drawings that the cross-sectional shapes of the first patterns H10_1 and H11_1 are similar to the cross-sectional shapes of the second patterns H10_2 and H11_2, the present invention is not limited thereto. For example, each of the first patterns H10_1 and H11_1 may have an arcuate cross-sectional shape, and each of the second patterns H10_2 and H11_2 may have a trapezoidal (or rectangular) cross-sectional shape.

When the panel bottom members 4010 and 4011 include both the first patterns H10_1 and H11_1 and the second patterns H10_2 and H11_2, respectively, the stress applied at the time of folding the display devices 10 and 11 can be more effectively alleviated.

As described above, according to the display device of embodiments, it is possible to improve folding reliability while maintaining impact resistance against an external impact. In addition, it is possible to prevent or substantially prevent a pattern formed on the panel bottom member from being visually recognized on the side of the display screen, thereby preventing or substantially preventing deterioration of an aesthetic sense.

Aspects and effects of the present invention are not limited by the foregoing, and other various aspects and effects are anticipated herein.

Although some exemplary embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A display device comprising:
a display panel including a first area and a second area;
a panel bottom member under the display panel and overlapping with the first area and the second area; and
a first pattern formed in the panel bottom member and overlapping with the first area,
wherein the panel bottom member comprises a buffer member and a support member between the display panel and the buffer member, and the first pattern is recessed from a lower surface of the support member.

2. The display device of claim 1, wherein the buffer member includes an elastic material, and
wherein the support member includes a rigid material.

3. The display device of claim 1, wherein the first pattern has a groove shape recessed from the lower surface of the support member.

4. The display device of claim 3, wherein the first pattern has a line shape extending continuously along the first area.

5. The display device of claim 1, wherein the first pattern has an uneven shape on the lower surface of the support member.

6. The display device of claim 5, wherein the first pattern includes a relatively protruded convex portion, and the convex portion is not protruded from the lower surface of the support member.

7. The display device of claim 1, wherein the support member includes a metal.

8. The display device of claim 7, wherein an end of the first pattern is aligned with a boundary between the first area and the second area.

9. The display device of claim 7, wherein an end of the first pattern is in the second area.

10. The display device of claim 1, further comprising a second pattern formed in the buffer member and overlapping with the first pattern.

11. A display device comprising:
a display panel including a first area and a second area located around the first area; and
a panel bottom member under the display panel and comprising a rigid material overlapping with the first area, the panel bottom member having a first thickness in the first area and a second thickness in the second area, the first thickness being thinner than the second thickness.

12. The display device of claim 11, wherein the panel bottom member includes a buffer member, and a first pattern is formed on an upper surface or a lower surface of the buffer member.

13. The display device of claim 12, wherein the first pattern has a groove shape recessed from the upper surface or the lower surface of the buffer member.

14. The display device of claim 12, wherein the first pattern has an uneven shape on the upper surface or the lower surface of the buffer member.

15. The display device of claim 11,
wherein an interval between an upper surface of the panel bottom member and the display panel is constant.

16. The display device of claim 15, wherein the rigid material includes a metal.

17. The display device of claim 15, further comprising a buffer member at a lower portion of the panel bottom member.

18. The display device of claim 17,
wherein the buffer member has a third thickness in the first area and a fourth thickness in the second area, and the third thickness is thinner than the fourth thickness.

19. The display device of claim 18, wherein the first thickness is thinner than the third thickness.

* * * * *